United States Patent
Kobayashi et al.

(10) Patent No.: US 7,230,896 B2
(45) Date of Patent: Jun. 12, 2007

(54) OPTICAL DISK REPRODUCING DEVICE AND OPTICAL DISK REPRODUCING METHOD

(75) Inventors: Toshikazu Kobayashi, Tokyo (JP); Takashi Enokihara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 503 days.

(21) Appl. No.: 10/659,751

(22) Filed: Sep. 10, 2003

(65) Prior Publication Data

US 2004/0095859 A1 May 20, 2004

(30) Foreign Application Priority Data

Oct. 21, 2002 (JP) .............................. 2002-305612

(51) Int. Cl.
*G11B 7/00* (2006.01)
(52) U.S. Cl. ................................ 369/53.14; 369/53.24; 369/44.27
(58) Field of Classification Search ............. 369/53.14, 369/44.29, 44.32, 53.24
See application file for complete search history.

(56) References Cited

U.S. PATENT DOCUMENTS

2002/0159343 A1* 10/2002 Fujimoto ................. 369/44.28
2005/0099900 A1* 5/2005 Buchler ................... 369/44.28

FOREIGN PATENT DOCUMENTS

| JP | 10-172147 | 6/1998 |
| JP | 2001-250245 | 9/2001 |
| JP | 2003-030865 | 1/2003 |
| WO | WO 0165550 A1 * | 9/2001 |

* cited by examiner

*Primary Examiner*—Wayne Young
*Assistant Examiner*—LaTanya Bibbins
(74) *Attorney, Agent, or Firm*—Katten Muchin Rosenman LLP

(57) ABSTRACT

A bottom hold circuit generates a bottom hold signal (BH signal) from an RFDC signal from an RF amplifier, and sends it to a comparator. The comparator compares a reference level and the BH signal, and generates an Rfdet signal having H level if the BH signal was found to be lower than the reference level. The Rfdet signal is a signal having H level when a laser spot falls in a data-recorded area on an optical disk, and having L level when in a non-recorded area. When it was detected that Rfdet signal had H level throughout a single turn of the disk, a servo-processing microcomputer controls an optical pickup so as to apply tracking servo. This makes it possible to precisely detect a boundary position between the data-recorded area and non-recorded area. If the optical disk is decentered, the boundary area corresponded to the amount of decentering can successfully be isolated from the data-recorded area.

16 Claims, 11 Drawing Sheets

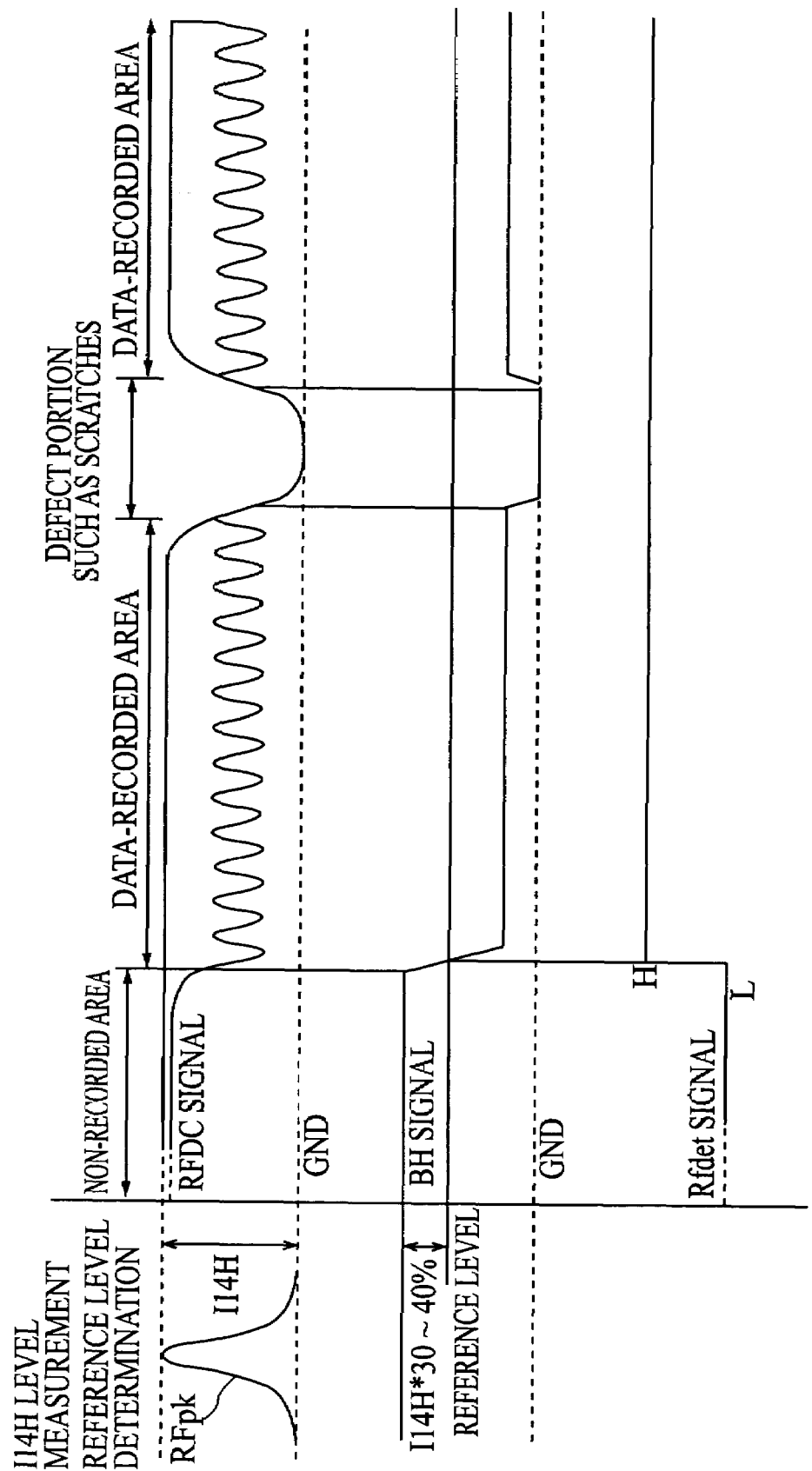

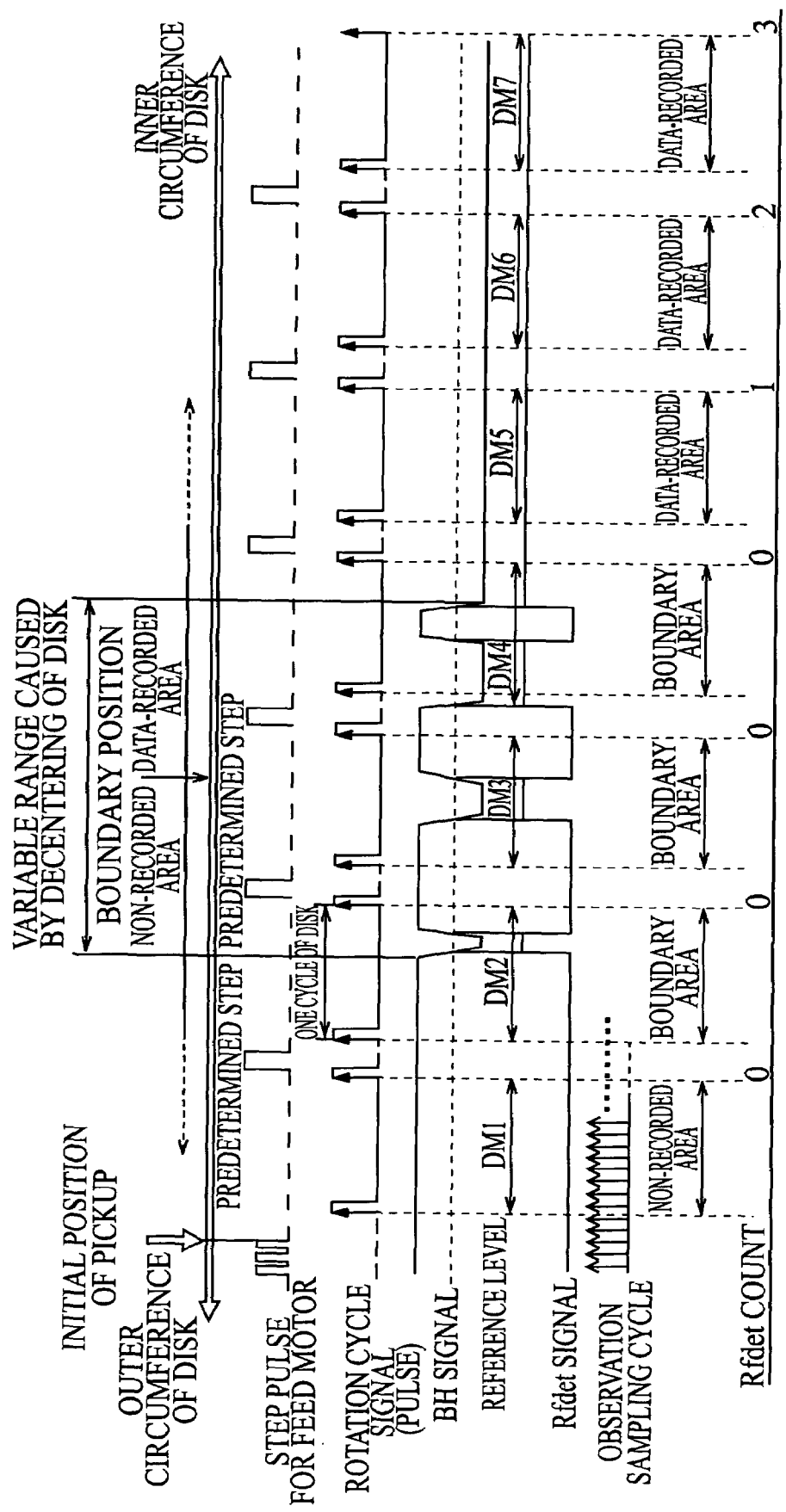

FIG.8

| | PICKUP POSITION [μm] | DETECTION AND DISCRIMINATION |
|---|---|---|
| NON-RECORDED AREA | -150 ~ -100<br>-100 ~ -50<br>-50 ~ 0 | DETECTION NG<br>DETECTION NG<br>DETECTION NG |
| BOUNDARY AREA ±75μm | 0 ~ 50<br>50 ~ 100<br>100 ~ 150 | DETECTION NG<br>DETECTION NG<br>DETECTION NG |
| (DATA-RECORDED AREA 350μm) | 150 ~ 200 | REPRODUCTION START |
| BOUNDARY AREA ±75μm | 200 ~ 250<br>250 ~ 300<br>300 ~ 350 | |
| NON-RECORDED AREA | 350 ~ 400<br>400 ~ 450 | |
| | RESULT | REPRODUCTION SUCCESSFUL |

OUTER CIRCUMFERENCE OF DISK

INNER CIRCUMFERENCE OF DISK

OPTICAL DISK REPRODUCING DEVICE AND OPTICAL DISK REPRODUCING METHOD

This application claims priority from Japanese Patent Application No. 2002-305612 filed on Oct. 21, 2002, the disclosure of which is hereby incorporated by reference herein.

BACKGROUND OF THE INVENTION

1. Field of the Invention

The present invention relates to an optical disk reproducing device and an optical disk reproducing method capable of reproducing rewritable or write-once optical disks.

2. Description of the Related Art

Publicly-known rewritable optical disks are typified by DVD-RW, DVD+RW and CD-RW, and write-once optical disks are typified by DVD-R, DVD+R and CD-R. The rewritable optical disks and write-once optical disks will be referred to as a "recordable disk", or simply as a "disk", hereinafter. An optical recording/reproducing device for handling these types of recording disks generally comprises a spindle motor for rotating the disk, a disk chucking mechanism disposed at the end of a rotational shaft of the spindle motor, an optical head for irradiating laser light onto the disk surface in order to record or reproduce signals, an optical head moving mechanism for moving the optical head to desired track position or in the vicinity thereof on the disk, and so forth.

For an exemplary case where recording/reproduction is carried out using recordable DVD-RW or DVD-R, the optical disk recording/reproducing device first moves the optical head to an initial position, and activates focus servo and tracking servo at the initial position. The initial position herein is often set a little more outwardly (outer circumferential side of the disk) than a read-in area considering variations in mechanical accuracy of the device or in dimensional accuracy of the disk, or compatibility to reproduction of disks having different formats. The disk has a groove and a land previously formed thereon. The groove has been wobbled based on modulation signals (referred to as "wobble signals", hereinafter) corresponding to control signals for the spindle motor and gate signals for detecting land pre-pits. The land has pre-pits (the aforementioned land pre-pits) for enabling precise positioning during recording on the disk, and for storing recording address and other information necessary for recording. The optical disk recording/reproducing device can detect an address on the optical disk at the initial position by demodulating an address signal from the wobble signals of the groove and from the land pre-pit signals of the land. The optical disk recording/reproducing device then generates information for moving the optical head (or laser spot position) to a target position where recording or reproduction is to be effected based on thus-detected address, and moves the optical head (or laser spot position) based on the generated information. The optical disk recording/reproducing device then locks the tracking servo and focus servo at the target position, and starts recording or reproduction of data. It is to be noted that the address signal of DVD+RW, CD-R and CD-RW, having no land pre-pit, is demodulated from the wobble signal.

Meanwhile, the optical disk recording/reproducing device for handling disks such as DVD-R and DVD-RW typically comprises a dedicated signal detection circuit for applying the tracking servo to the groove based on so-called radial push-pull system, and a demodulation circuit for demodulating the address signal from the land pre-pit signal.

On the other hand, disk reproducing devices for DVDs, such as DVD-video, DVD-ROM, DVD-R and DVD-RW (referred to as "optical disk reproducing device", hereinafter), adopt the pit-tracking system by which tracking servo is applied to a track comprising a series of signal pits recorded on the disk surface based on so-called differential phase detection method. That is, the disk reproducing device of this type generally does not have any signal detection circuit for applying tracking servo to the groove or any address demodulation circuit. The optical disk reproducing system therefore can apply tracking servo to an area on the recordable disk where data is recorded (referred to as a "data-recorded area", hereinafter), but cannot apply tracking servo to an area where data is not recorded (referred to as a "non-recorded area", hereinafter). In other words, it is to be understood that the optical disk reproducing device cannot reproduce data recorded on the disk when it failed in detecting any data-recorded area at the initial position, that is, when it failed in applying tracking servo due to absence of the pit track at the initial position, even if data-recorded area actually resides on the optical disk.

On the other hand, Japanese Patent Application No. 10-172147 proposes an optical disk reproducing device capable of discriminating the data-recorded area from the non-recorded area (mirror surface) on the recordable disk, based on results of comparison between an amplitude hold level of an RF signal output from the optical head and a predetermined reference level. It is to be noted that the optical head of the optical disk reproducing device dedicated to reproduction of the optical disk is expressed as an optical pickup.

More specifically, the optical disk reproducing device described in Japanese Patent Application No. 10-172147 moves the optical pickup to a predetermined detection point (referred to as a "first detection point", hereinafter), and compares an amplitude hold level of an RF signal output from the optical pickup at the first detection point with a predetermined reference level. If the amplitude hold level is lower than the reference level, that is, if an area on the optical disk corresponded to the first detection point is the non-recorded area, the optical disk reproducing device shifts the optical pickup by a predetermined distance (5 mm, for example) towards the center of the disk, and at that point (referred to as a "second detection point", hereinafter), compares again the amplitude hold level of the RF signal from the optical pickup with the reference level. If the amplitude hold level obtained at the second detection point is found to exceed the reference level, the optical disk reproducing device again pushes the optical pickup back towards the outer circumferential side of the disk by half of the aforementioned predetermined distance (2.5 mm, for example), and, assuming that position as a new first detection point, compares again the amplitude hold level with the reference level. The optical disk reproducing device repeats such shifting of the detection points and level comparison until the amplitude hold level exceeds the reference level. When the amplitude hold level exceeds the reference level at any detection point, that is, when the data-recorded area is detected, the optical disk reproducing device immediately starts data reproduction at that detection point.

The optical disk reproducing device described in Japanese Patent Application No. 10-172147 can discriminate whether the optical pickup falls on the data-recorded area or not, through the aforementioned shifting of the detection points and level comparison, and is designed so that the optical pickup, even if fallen on the non-recorded area, can escape therefrom so as to detect the data-recorded area.

Meanwhile, recent growing demands are directed to an optical disk reproducing device having a more advanced accuracy in detecting a boundary position between the data-recorded area and non-recorded area. If precise detection of the boundary position is realized, it becomes possible for the optical disk reproducing device not only to specify a target position for starting reproduction more rapidly and more accurately, but also to reproduce recorded data even when the amount of recorded data is extremely small and thus the width of the data-recorded area (width in the radial direction of the disk) is extremely narrow.

Referring now to FIG. 1, if a center hole 101 of a disk 100 is decentered from the center of rotation 102 of the disk 100, or if the center position of chucking of the disk is decentered from the center of rotation 102 for example, nonconformity between the center of rotation 102 of the disk 100 and the center of a rotational shaft of a spindle motor consequently occurs. This status will be expressed as "the disk 100 is decentered". It is also to be noted that the amount of nonconformity between the center of rotation 102 of the disk 100 and the center position of the center hole 101 or the amount of nonconformity between the center of rotation 102 and the center position of chucking is expressed as "the amount of decentering of the disk".

When the disk 100 is decentered as described above, a locus of laser spot irradiated on the disk 100 under rotation periodically swings (wobbles) towards the inner and outer circumferential sides of the disk 100 by a distance corresponded to the amount of decentering as shown by a trace pattern TPa in FIG. 2. On the contrary, when the disk 100 is not decentered, the locus of laser spot does not wobble neither inwardly nor outwardly (amount of decentering=0) as shown by a trace pattern TPb in FIG. 2. It is to be noted that the individual disk positions A, B, C and D in FIG. 1 correspond with the disk positions A, B, C and D in FIG. 2, respectively.

When the center hole 101 is placed as being decentered towards the disk position D, the locus of laser spot on the rotating disk 100 will be such that the disk positions A and C show the amount of decentering of 0, the disk position B shows an outward dislocation by an amount of decentering, and the disk position D shows an inward dislocation by an amount of decentering. In the exemplary case of FIGS. 1 and 2, disk positions B and C express dislocation turning points where the locus of laser spot is directed outwardly or inwardly. The dislocation turning points also express points of change where the relative speed between the laser spot and the disk increases or decrease.

Therefore, in the case where the disk 100 is decentered as in the example of FIGS. 1 and 2, if any laser spot resides within an area having a width corresponded to the amount of decentering from the boundary position (referred to as a "boundary area", hereinafter), the laser spot consequently travels through the data-recorded area and non-recorded area in an alternate manner in accordance with the rotation of the disk 100. In particular when the amount of decentering of the disk 100 becomes relatively large, the boundary area is also widened, and this makes the laser spot more likely to travel through the data-recorded area and non-recorded area in an alternate manner.

In this case, it is very difficult for the optical disk reproducing device to detect the boundary position, and in the worst case, tracking servo cannot be activated in the data-recorded area, and this may cause hung-up of the servo control. Therefore, if the boundary area (having a width corresponded to the amount of decentering) can be accurately isolated from the data-recorded area, the optical disk reproducing device can certainly apply the tracking servo in the data-recorded area after being isolated from the boundary area, and can also rapidly detect the boundary position. Accurate isolation of the boundary area from the data-recorded area is also advantageous in that the optical disk reproducing device can certainly apply the tracking servo even when the data-recorded area has a width only slightly larger than that of the boundary area (width corresponded to the amount of decentering), and, as a consequence, in that data recorded in the data-recorded area can successfully be reproduced.

SUMMARY OF THE INVENTION

The present invention is completed in order to respond the aforementioned subjects, and is to provide an optical disk reproducing device and an optical disk reproducing method, both of which being capable of precisely detecting the boundary position between the data-recorded area and the non-recorded area without using any address signals or the like demodulated from the groove and land pre-pits, capable of certainly detecting the data-recorded area irrespective of amount of decentering of the disk or volume of data recorded in the disk, and thus capable of allowing precise and rapid reproduction of data.

An optical disk reproducing device of the present invention comprises a motor for rotating an optical disk having at least either one of a first area and a second area; an optical head for receiving a spot light after being reflected on the optical disk; a signal generating section for generating a comparison reference signal from an output signal of the optical head; a comparing section for comparing the comparison reference signal with a predetermined threshold value, and generating a comparison signal containing at least either one of a first signal status corresponded to the first area and a second signal status corresponded to the second area; and a control section for observing signal status of the comparison signal at least throughout a duration during which the spot light goes round once on the optical disk, and making a decision, based on the observed result, about in which of the first area and the second area the spot light falls.

A method of reproducing an optical disk of the present invention comprises the steps of rotating an optical disk having at least either one of a first area and a second area; generating a light reception signal of a spot light reflected by the optical disk after being irradiated therewith; generating a comparison reference signal from the light reception signal; generating a comparison signal containing at least either one of a first signal status corresponded to the first area and a second signal status corresponded to the second area, by comparing the comparison reference signal with a predetermined threshold value; and observing signal status of the comparison signal at least throughout a duration during which the spot light goes round once on the optical disk, and making a decision, based on the observed result, about in which of the first area and the second area the spot light falls.

More specifically, according to the present invention, in which of the first area and the second area the spot light falls is discriminated throughout a single turn of the optical disk, so that the optical disk reproducing device can detect whether the spot light has always resided in the first area throughout a single turn of the optical disk, or whether the spot light has gone through the second area even only once throughout a single turn of the optical disk. Assuming now that the first area is the data-recorded area, if the spot light has always resided in the first area throughout a single turn of the optical disk, the tracking servo would never hang up even when the optical disk was decentered or volume of data recorded in the disk was extremely small. On the other hand, if the spot light has gone through the second area even only once throughout a single turn of the optical disk, the tracking servo would hang up. Thus in the present invention, the observation of the locus is made again after the spot light is shifted by a predetermined distance in the radial direction of the optical disk, so as to ensure detection of the first area while keeping out of the boundary area between the first and second areas.

As has been described in the above, the present invention is successful in precisely detecting the boundary position between the first area (typically the data-recorded area) and the second area (typically the non-recorded area), and for the case where the optical disk is decentered, the boundary area corresponded to the amount of decentering can be isolated from the first area (data-recorded area).

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 6 is a timing chart for describing interrelations among RFDC signal, BH signal, reference level and Rfdet signal in the first embodiment;

FIG. 7 is a timing chart for describing a series of operations such that the optical disk reproducing device of the first embodiment successively moves the optical pickup, and starts reproduction of the data in the data-recorded area;

FIG. 8 is a drawing for describing specific operations such that the optical disk reproducing device of the present embodiment isolates the boundary area from a narrow data-recorded area, and starts reproduction of the data in the data-recorded area;

DETAILED DESCRIPTION OF THE PREFERRED EMBODIMENTS

Figure 1:
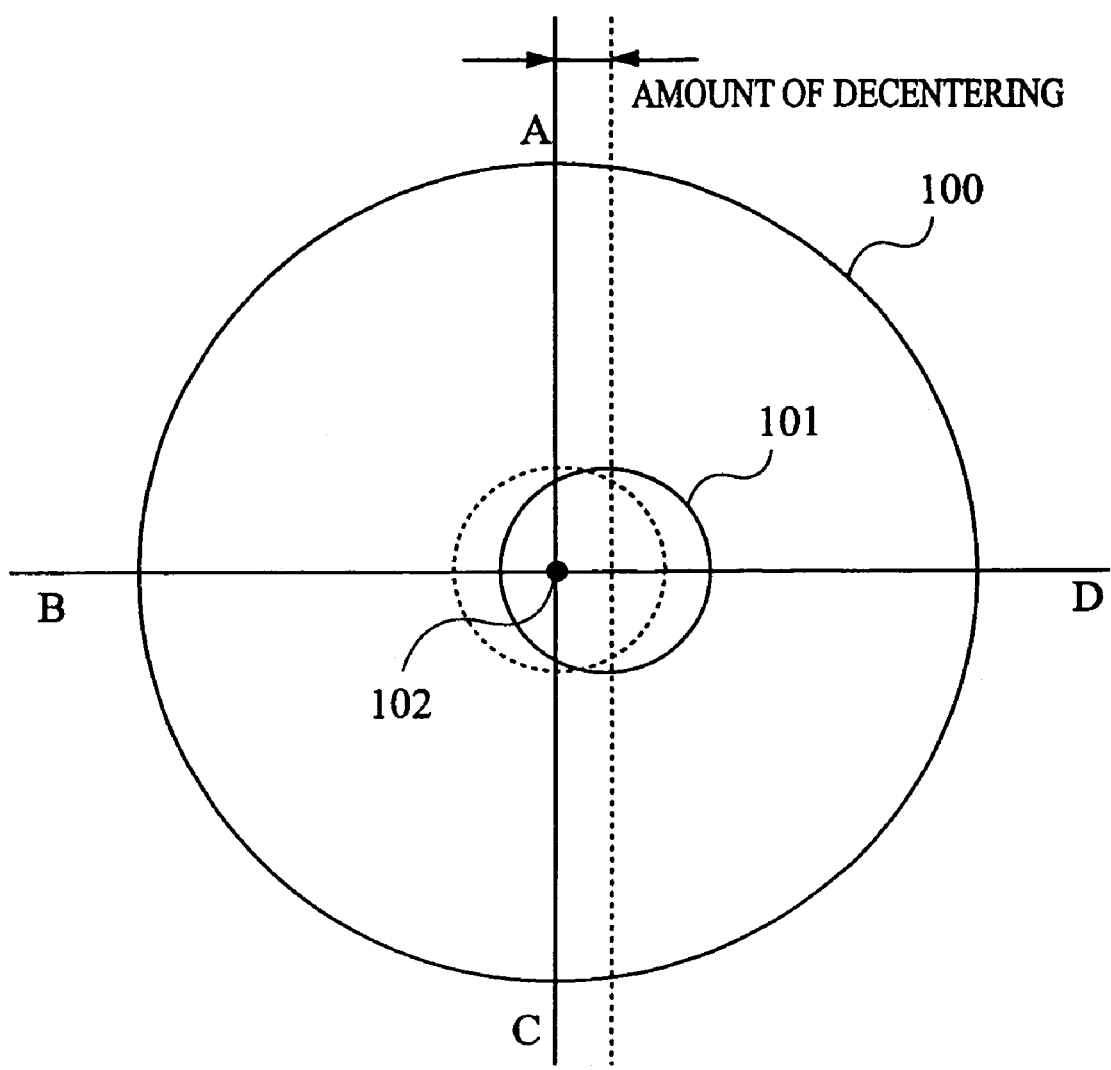
FIG. 1 is a drawing of one example of a decentered disk.
Figure 2:
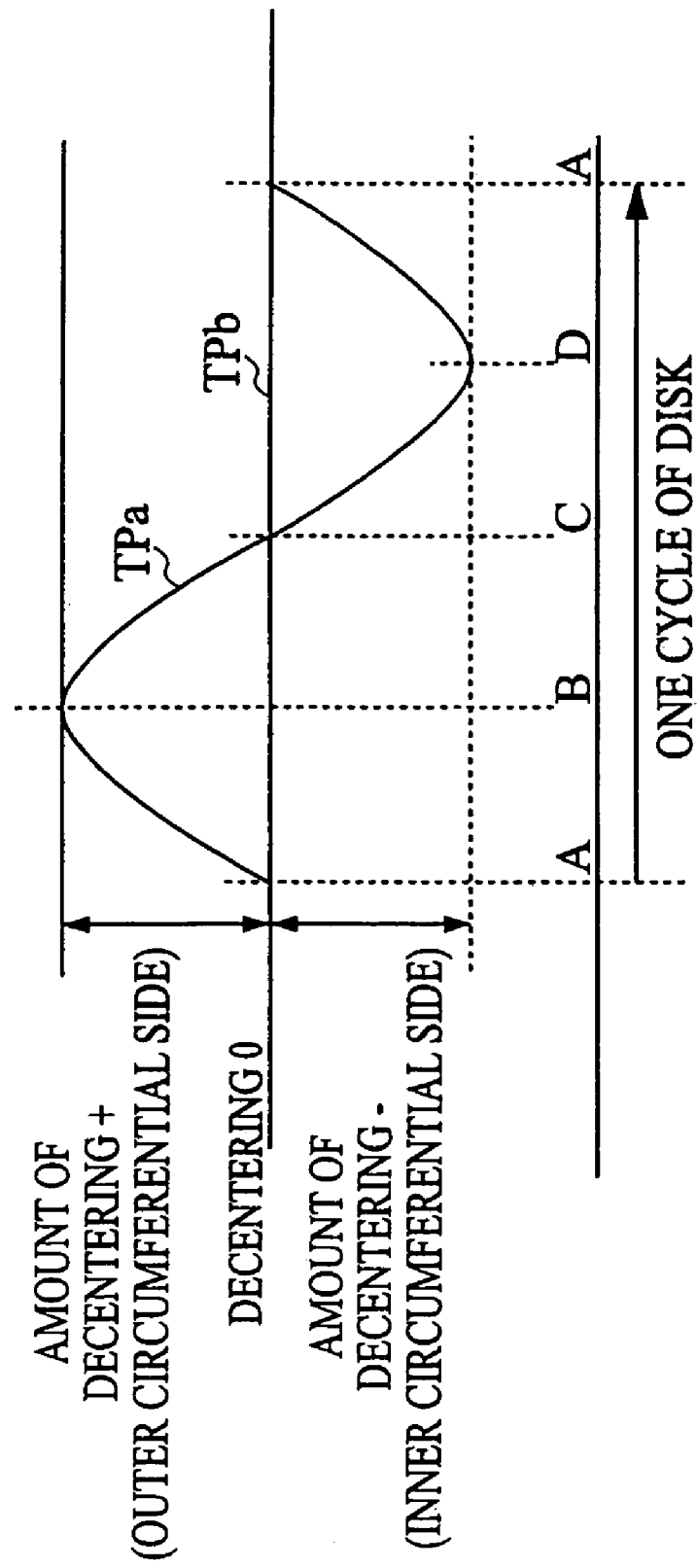
FIG. 2 is a drawing for describing relation between a locus of a laser spot traveling on the decentered disk and the disk positions.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 3:
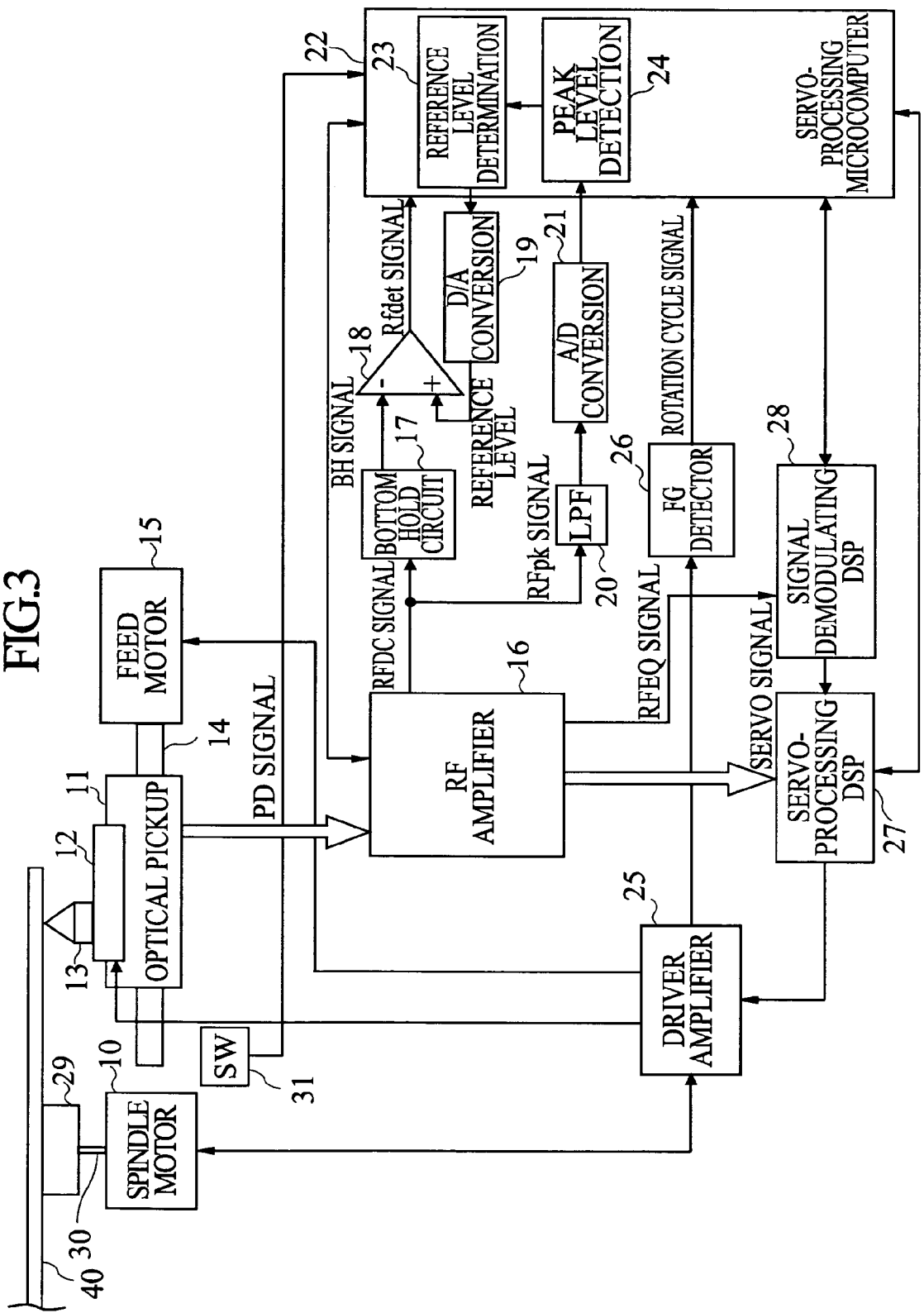
FIG. 3 is a block diagram showing an overall constitution of an optical disk reproducing device according to a first embodiment.

Overall Constitution of Essential Portions and Basic Operations of Optical Disk Reproducing Device An overall constitution of the optical disk reproducing device of the first embodiment applied with the present invention is shown in FIG. 3. The optical disk reproducing device of the first embodiment is typically designed so that the tracking servo is applied to the tracks comprising signal pit strings on the disk surface, but has no constitution for applying tracking servo to the pre-groove. The signal pit string may be any of a pit string formed by allowing the surface of a recording film to project or recess, a pit string corresponded to magneto-optical effect or on phase transition, and the like.

In FIG. 3, a disk 40 is a recordable disk having a data-recorded area and a non-recorded area (mirror surface), and is typified by DVD-RW and DVD-R. It is to be noted now that the disk 40 may be any disk selected from those conforming to various standards other than DVD standard, those of read-only type, blank disk having no data recorded therein, multi-layered disk, or even may be unsupported disk not conforming to any disk-related standards.

The description starts with basic operations of the individual sections of the optical disk reproducing device shown in FIG. 3 when data is reproduced from the disk 40 under a condition where the tracks on the data-recorded area of the disk 40 is appropriately traced.

The disk 40 is chucked by a chucking mechanism 29 disposed at the end of a rotational shaft 30 of a spindle motor 10, and rotated by the spindle motor 10 at a predetermined speed.

The spindle motor 10 is driven based on drive signals fed from a driver amplifier 25. The spindle motor 10 is also equipped with a rotation detection mechanism using a Hall element. A motor rotation detection signal detected by the rotation detection mechanism (i.e., disk rotation detection signal) is sent through the driver amplifier 25 to an FG detector 26.

The FG detector 26 generates a rotation cycle signal expressing a period of rotation of the spindle motor 10 (i.e., rotation period of disk) from the motor rotation detection signal, and the obtained rotation cycle signal is sent to a servo-processing microcomputer 22.

An optical pickup 11 comprises a laser diode for emitting laser light; a divisional photo-detector for converting intensity of the incident light on a light receiving surface having a predetermined pattern into magnitude of voltage; an optical system for allowing the laser light emitted from the laser diode to be condensed on the recording surface of the disk 40 and for directing the light reflected from the recording surface towards the light receiving surface; a biaxial actuator 12 for moving an objective lens 13 contained in the optical system in the direction parallel to the recording surface of the disk 40 (tracking direction), or vertical thereto (focusing direction).

Output signal from the divisional photo-detector (referred to as "PD signal", hereinafter) of the optical pickup 11 is sent to an RF amplifier 16. The RF amplifier 16 carries out summation/subtraction of PD signals corresponded to the individual light receiving elements and level correction, and outputs an RF signal (HF signal) as a total of reflection signals from the disk. The RF signal herein will be referred to as an RFDC signal because this is detected as a direct-current signal and has a level relative to the ground level (GND). The RF amplifier 16 corrects (i.e., equalizes) frequency characteristics of the RFDC signal, and sends the corrected signal (referred to as an RFEQ signal, hereinafter) to a signal demodulating DSP (digital signal processor) 28. The RF amplifier 16 also extracts a focus error signal and a tracking error signal from the PD signal, and sends a servo signal comprising these error signals to a servo-processing DSP 27.

The servo-processing DSP 27 generates, based on the focus error signal out of the aforementioned servo signals, a focus servo control signal for effecting focus servo after being undergone A/D conversion and digital filtering; also generates, based on the tracking error signal, a tracking servo control signal for effecting tracking servo after being undergone A/D conversion and digital filtering; and then sends these servo control signals to the driver amplifier 25. The driver amplifier 25 in this timing generates a focus drive signal for driving the biaxial actuator 12 of the optical pickup 11 in the focusing direction in response to the aforementioned focus servo control signals, and also generates a tracking drive signal for driving it in the tracking direction in response to the aforementioned tracking servo control signal. Driving of the biaxial actuator 12 according to these focus drive signal and tracking drive signal allows the objective lens 13 of the optical pickup 11 to be focused on the recording surface of the disk 40 to thereby form a laser spot, and further allows the laser spot to trace the tracks.

The signal demodulating DSP 28 binarizes the RFEQ signal fed from the RF amplifier 16, and carries out signal demodulation processing corresponded to signal modulation processing previously applied during recording to the disk 40. The signal demodulating DSP 28 then carries out error correction and decoding against demodulating signal to thereby demodulate the data. Thus demodulated data is output through an output terminal, not shown, to external devices. The signal demodulating DSP 28 also demodulates an address signal from the RFEQ signal. Thus demodulated address signal is sent to the servo-processing microcomputer 22.

The optical disk reproducing device is also equipped with a pickup feed mechanism for moving the optical pickup 11 in the radial direction of the disk. The pickup feed mechanism typically comprises a lead screw 14, which is a feed screw extending along the radial direction of the disk 40, a guide rail not shown, a feed motor (e.g., stepping motor) 15 for rotating the lead screw 14, and so forth. The optical pickup 11 has a nut member as being fitted to the lead screw 14. With this configuration, the optical pickup 11 can move in the radial direction of the disk when the lead screw 14 is rotated by the feed motor 15.

In the movable range of the optical pickup 11 with the aid of the pickup feed mechanism, a limit switch 31 is disposed at the feed limit position on the innermost circumferential side of the disk. The limit switch 31 detects the optical pickup 11 when it reaches the feed limit position on the innermost circumferential side of the disk, with the aid of the pickup feed mechanism. A detection signal of the limit switch 31 is sent to the servo-processing microcomputer 22. Upon receipt of the detection signal from the limit switch 31, the servo-processing microcomputer 22 detects that the optical pickup 11 has reached the feed limit position on the innermost circumferential side of the disk.

The servo-processing microcomputer 22 also generates a rotation control information for allowing the spindle motor 10 to rotate at a predetermined speed, based on the clock signal, the rotation cycle signal and the address signal, and then sends the rotation control information to the servo-processing DSP 27. The servo-processing DSP 27 generates a rotation servo control signal for the spindle motor 10 based on the rotation control information, and sends the control signal to the driver amplifier 25. The driver amplifier 25 in this timing generates a motor drive signal for rotating the spindle motor 10, based on the rotation servo control signal. This allows the spindle motor 10 to rotate at a predetermined speed corresponded to the reproduction position on the disk 40. The servo-processing microcomputer 22 also generates, based on the address signal, a target position information used for moving the optical pickup 11 in the radial direction of the disk, and sends thus-produced information to the servo-processing DSP 27. The servo-processing DSP 27 in this timing generates, based on the target position information, a step control signal for rotating the feed motor 15 of the pickup feed mechanism, and then sends the step control signal to the driver amplifier 25. The driver amplifier 25 generates a step pulse signal for driving the feed motor 15, based on the step control signal. This allows the feed motor 15 to step-wisely feed the optical pickup 11 to the target position in the radial direction of the disk.

Configuration and Operation for Detecting Boundary Position

Figure 4:
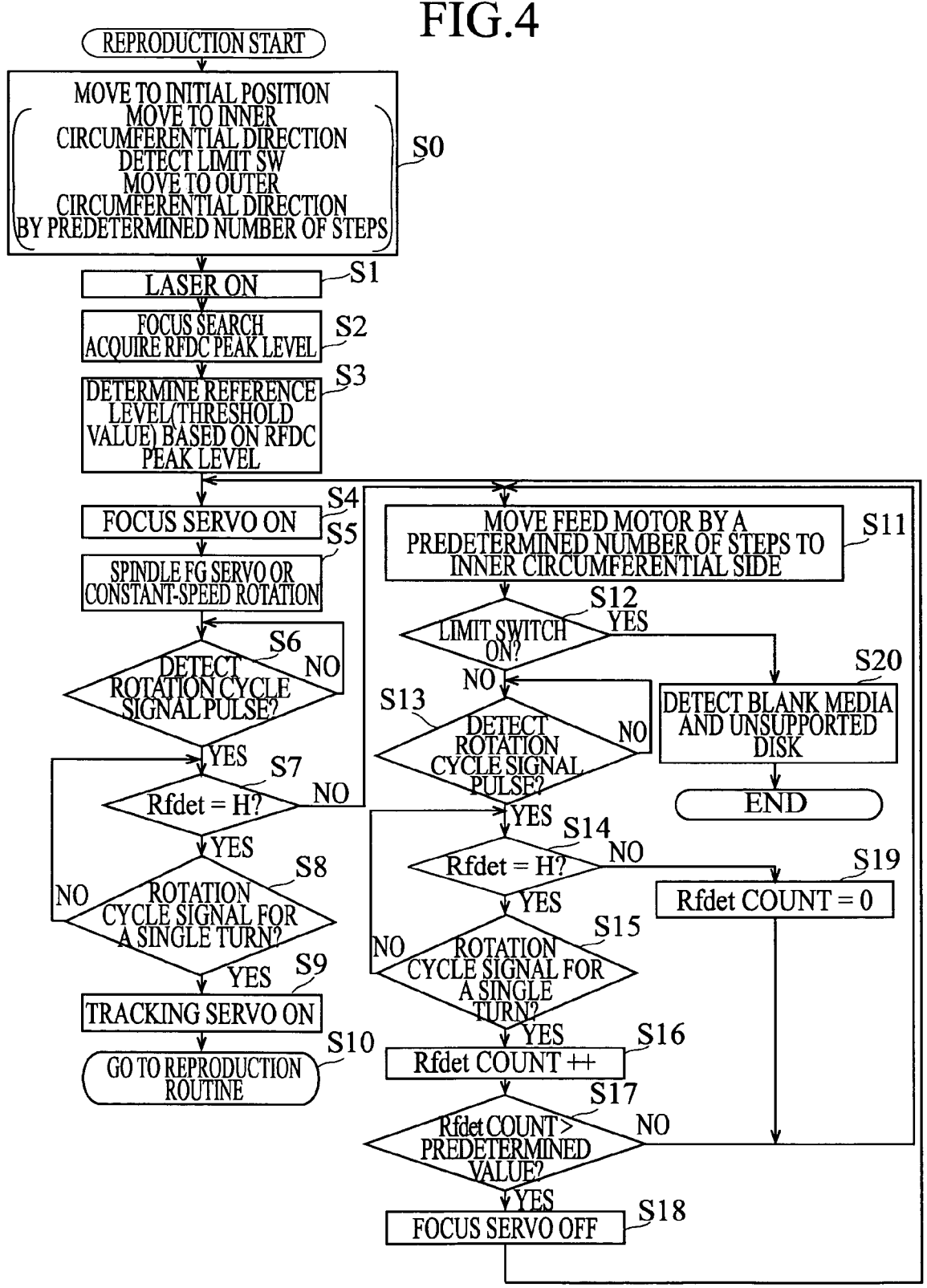
FIG. 4 is a flow chart for describing a series of processing such that the optical disk reproducing device of the first embodiment detects the boundary position between the data-recorded area and the non-recorded area on the disk, and starts reproduction of the data in the data-recorded area.

The optical disk reproducing device according to the embodiment is configured as described below and executes a series of processing shown in the flow chart of FIG. 4, in order to precisely detect the boundary position between the data-recorded area and non-recorded-area on the disk 40, and to certainly reproduce data from the data-recorded area irrespective of amount of decentering of the disk or volume of data stored in the disk.

In advance of starting reproduction of the disk 40, the servo-processing microcomputer 22 measures a level (I14H level) of a peak value of the RFDC signal, and based on the measured level of the peak value, determines a certain threshold value (referred to as "reference level value", hereinafter) for discriminating presence of the data-recorded area. According to the standards for modulation levels descried in the DVD Book, it is defined that the standard for modulation level of the RFDC signal (I14/I14H) must be 60% or more of I14H level. The aforementioned reference level in the present embodiment is therefore set to an appropriate level so that it falls within a 60% range of the I14H level. For example in this embodiment, the servo-processing microcomputer 22 sets a level which is typically as large as 30% to 40% of the I14H level as the reference level. It is to be noted now that I14H refers to an RF amplitude level at a space portion (mirror portion having no pits) as large as 14T (T=recording clock period) which is a maximum mark length in the standards specified in the DVD Book. On the other hand, I14 refers to a level obtained by subtracting I14L, which is a minimum level in a portion as large as 14T (RF amplitude level at the pit portion), from I14H, which is a maximum RF amplitude level in a portion as large as 14T. It is thus defined that (I14/I14H) represents a modulation factor.

Figure 5:
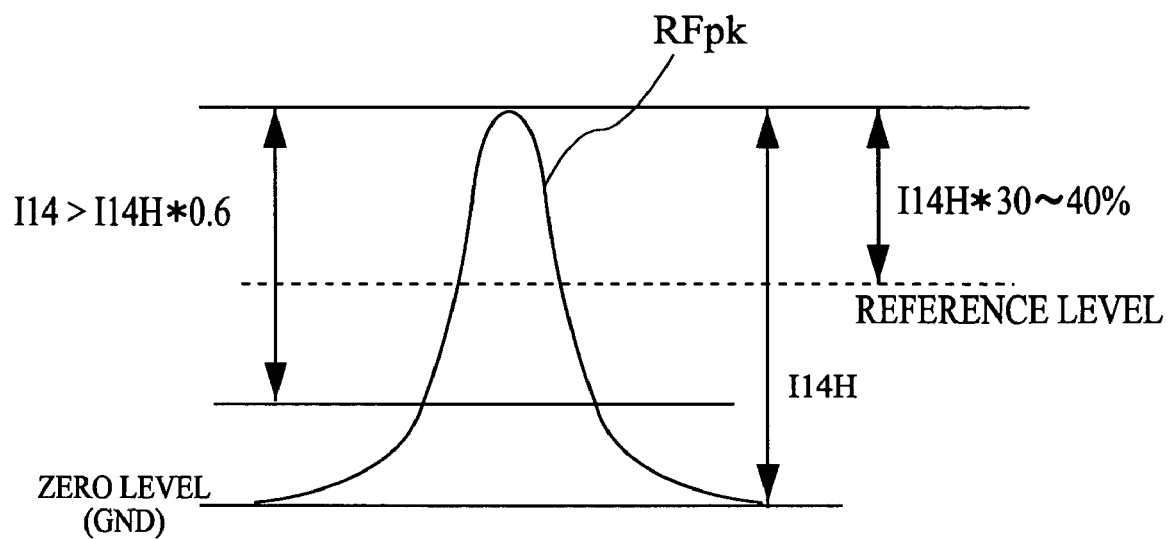
FIG. 5 is a drawing for describing a reference level determined based on I14H level.

In a specific procedure for setting the reference level, in order to set the reference level, the servo-processing microcomputer 22 in step S0 first controls the driver amplifier 25 through the servo-processing DSP 27 thereby moving the optical pickup 11 to a predetermined initial position, then in step S1 turns on the laser diode of the optical pickup 11, and then in step S2 drives the biaxial actuator 12 so as to bring up or down the objective lens 13 in the focusing direction. The RFDC signal output herein from the RF amplifier 16 has the I14H level (mirror level) as shown in FIG. 5, and will be referred to as "RFpk signal", hereinafter.

In the aforementioned step S2, the RFpk signal is sent to a low pass filter (LPF) 20 having a cut-off frequency of 100 kHz, for example. The low pass filter 20 is provided so as to remove EFM (eight-to-fourteen modulation) signal component, if contained in the RFpk signal, from the RFpk signal. The RFpk signal output from the low pass filter 20 is converted by an A/D converter 21 into a digital data (referred to as "RFpk data", hereinafter), and is then sent to a peak-level detection section 24 in the servo-processing microcomputer 22. The peak-level detection section 24 determines, based on the RFpk data, data which expresses a peak level of the RFDC signal (RFDC peak level), that is, a data expressing the I14H level, and then sends thus-determined data to a reference level determining section 23. It is to be noted that when the RFDC peak level is detected, the servo-processing microcomputer 22 controls the driver amplifier 25 through the servo-processing DSP 27 so as to step-wisely rotate the spindle motor 10 by short durations of time, and detects the individual peak levels for a plurality of points of measurement, to thereby minimize a variation of detected values in the peak levels measured at the individual points of measurement.

Next in step S3, the reference level determining section 23 determines a level which accounts for 30% to 40% of the I14H level data, for example, as the reference level. As described in the above, the servo-processing microcomputer 22 is designed to measure the RFDC peak levels at the predetermined positions of measurement on the disk 40, and to determine the reference level based on thus-measured RFDC peak level. This successfully makes the reference value optimum as being suited for variations by disk, or types of the disks.

It is also allowable that the servo-processing microcomputer 22 is such as outputting a fixed value, which is set considering data such as variation in the reflectivity of the disk 40, as the reference data. It is also allowable to configure the servo-processing microcomputer 22 so as to control the RF amplifier 16 while setting the reference level as a fixed value, and to vary the gain of the RFDC signal so as to set the I14H peak value to a certain constant level. It is still also allowable to configure the servo-processing microcomputer 22 so as to discriminate types of the disk loaded on the optical disk reproducing device, and to output a fixed value corresponded to the discriminated type of the disk as the reference level.

The data expressing the reference level is sent to a D/A converter 19. The D/A converter 19 converts the data expressing the reference level into an analogue reference level value (predetermined threshold value). The reference level value is then sent to a non-inverting input terminal of a comparator 18.

After the reference level is thus determined, the servo-processing microcomputer 22 then in step S4 drives the objective lens 13 of the biaxial actuator 12 to apply focus servo, and then in step S5 rotates the spindle motor 10. The servo-processing microcomputer 22 in this timing controls the servo-processing DSP 27 in two ways, such as applying servo (spindle FG servo), based on the rotation cycle signal from the FG detector 26 so as to rotate the spindle motor 10 at a constant speed, or such as terminating drive voltage supply to the spindle motor 10 after a predetermined number of rotation is reached so as to allow the spindle motor 10 to rotate in a coasting manner. When the spindle motor 10 is to be rotated in a coasting manner, detection of the boundary position between the data-recorded area and non-recorded area is carried out before the speed of rotation of the spindle motor 10 decreases below the limit speed for the boundary detection.

In step S5, the RFDC signal as shown in FIG. 6 is consequently output from the RF amplifier 16. FIG. 6 shows an exemplary case where the laser spot falls in the vicinity of the boundary position between the data-recorded area and non-recorded area on the disk 40. The RFDC signal in this example has a nearly-constant high level when the laser spot falls on the non-recorded area, but has a variable level depending on the recording pits formed in the groove when the laser spot falls on the data-recorded area, or becomes a signal such as having a level lowered to as low as the ground (GND) level when the laser spot falls on the defect portion due to scratches on the disk. The RFDC signal is then sent to a bottom hold circuit 17.

The bottom hold circuit 17 generates a bottom hold signal (suitably referred to as "BH signal", hereinafter) of a modulated component contained in the RFDC signal, and sends the BH signal to an inverting input terminal of the comparator 18. Time constant (CR time constant) of the bottom hold circuit 17 is set to 1 ms to 2 ms, for example. The time constant herein is determined considering influences of lowered amplitude level of the RFDC signal caused by the laser spot crossing the tracks (referred to as track traverse, hereinafter) under a decentered condition of the disk 40. Assuming now that the time required for a single turn of the disk 40 as 40 ms, a track pitch as 0.74 µm, and a maximum amount of decentering of the disk 40 as 150 µm, an average time affected by variation in the modulation level due to track traverse under such maximum amount of decentering is estimated as (40 ms/2)/(150 µm/0.74 µm)=0.1 ms or around. On the other hand, assuming now that a minimum amount of decentering as 10 µm, an average time affected by variation in the modulation level due to track traverse under such minimum amount of decentering is estimated as (40 ms/2)/(10 µm/0.74 µm)=1.5 ms or around. Although details will be given later, assuming now that one cycle of the disk 40 as 40 ms, and the observation sampling cycle for detecting presence of the data-recorded area as 40 times per a single turn of the disk 40, resolution for detection of presence of data-recorded area in the boundary area can be estimated as 40 ms/40=1 ms. Assuming again that the observation sampling cycle as 20 times per a single turn of the disk 40, resolution for detection of presence of the data-recorded area in the boundary area can be estimated as 40 ms/20=2 ms. Based on this discussion, the time constant of the bottom hold circuit 17 is set to 1 ms to 2 ms as described in the above, considering the influences of lowered modulation level of the RFDC signal caused by the laser spot crossing the tracks depending on the amount of decentering of the disk 40, and also considering the resolution for detection of presence of the data-recorded area in the boundary area.

To the non-inverting input terminal of the comparator 18, the reference level value (predetermined threshold value) previously generated by the servo-processing microcomputer 22 has been input. The comparator 18 compares a level value of the BH signal to the reference level value, and outputs a signal (referred to as "Rfdet signal", hereinafter) which becomes L (low) when the BH signal exceeds the reference level, and becomes H (high) when the BH signal comes short of the reference level. That is, the Rfdet signal in the H level expresses that the laser spot falls in the data-recorded area on the disk 40, and that in the L level expresses that the laser spot falls in the non-recorded area. The Rfdet signal is sent to the servo-processing microcomputer 22. In the present embodiment, since the bottom hold signal of the RFDC signal is compared with the reference level, detection of H and L levels of the Rfdet signal is hardly affected by any defective portion of the disk due to scratches or the like, even if the RFDC signal is lowered to as low as the ground level due to such defective portions on the disk. While the Rfdet signal in an exemplary case shown in FIG. 3 is generated by comparing the BH signal and a signal obtained after D/A conversion of the reference level, it is also allowable to input the BH signal after A/D conversion to the servo-processing microcomputer 22 so as to allow the servo-processing microcomputer 22 to generate Rfdet signal on the software basis.

The servo-processing microcomputer 22 in step S6 monitors the rotation cycle signal from the FG detector 26 as shown in FIG. 7, and discriminates whether a pulse is detected for every turn of the spindle motor 11 (i.e., a single turn of the disk 40). If the pulse is detected for every turn of the disk 40 in step S6, the servo-processing microcomputer 22 advances its process to step S7 and thereafter.

In step S7, the servo-processing microcomputer 22 discriminates whether the Rfdet signal from the comparator 18 has H level for every predetermined observation sampling cycle as shown in FIG. 7. At the same time, the servo-processing microcomputer 22 in step S8 also discriminates whether the disk 40 finishes a single turn, based on the pulsed rotation cycle signal from the FG detector 26. Assuming now in the present embodiment that one cycle of rotation of the disk 40 as 40 ms, and the observation sampling cycle as 1 ms, the servo-processing microcomputer 22 conducts the discrimination processing 40 times per a single turn of the disk. The observation sampling cycle is, of course, not limited to 1 ms as in the above, and may be 2 ms for example. For the case with an observation sampling cycle of 2 ms, the servo-processing microcomputer 22 conducts the discrimination processing 20 times per a single turn of the disk.

If H level is detected in all of the observation sampling cycles during a single turn of the disk 40 in steps S7 and S8 (or L level is not detected), the servo-processing microcomputer 22 advances its process to step S9. On the other hand, if H level is not detected in any of the observation sampling cycles during a single turn of the disk 40 in steps S7 and S8 (or L level is detected in all of them), or if the H level is not detected even only once during a single turn of the disk 40 (or L level is detected even only once), the servo-processing microcomputer 22 advances its process to step S11 and thereafter. That is, the servo-processing microcomputer 22 discriminates whether the laser spot always fell in the data-recorded area or passed even only once the non-recorded area in the individual observation sampling cycle during a single turn of the disk 40.

Assuming now that the laser spot falls in the data-recorded area outside the area having a width corresponded to the amount decentering (i.e., boundary area) under a decentered condition of the disk 40, the Rfdet signal always has H level throughout a single turn of the disk 40 as indicated by ranges DM5, DM6 and DM7 in FIG. 7. The Rfdet signal always has H level also when the laser spot falls in the data-recorded area under a non-decentered condition of the disk 40. As is clear from the above, when the laser spot is found to always fall in the data-recorded area throughout a single turn of the disk 40 irrespective of presence or absence of decentering of the disk 40, the optical disk reproducing device of the present embodiment can apply tracking servo to the tracks comprising signal pit strings on the data-recorded area.

Accordingly, if it is discriminated that H level has been detected in all observation sampling cycles throughout a single turn of the disk 40 in steps S7 and S8, the process advances to step S9, and the servo-processing microcomputer 22 controls the driver amplifier 25 through the servo-processing DSP 27 to thereby turns the tracking servo ON. The process then advances to step S10 for a reproduction process routine, where reproduction of signals from the data-recorded area on the disk 40 is started.

On the contrary, assuming now that the laser spot falls in the non-recorded area outside the boundary area under a decentered condition of the disk 40, the Rfdet signal always has L level throughout a single turn of the disk 40 as indicated by range DM1 in FIG. 7. The Rfdet signal always has L level also when the laser spot falls in the non-recorded area under a non-decentered condition of the disk 40. Assuming that the laser spot falls in the boundary area under a decentered condition of the disk 40, the Rfdet signal has a mixed status of H level and L level throughout a single turn of the disk 40 as indicated by ranges DM2, DM3 and DM4 in FIG. 7. As is clear from the above, when the laser spot is found to pass through the non-recorded area even only once throughout a single turn of the disk 40, the optical disk reproducing device is not successful in certainly applying the tracking servo.

For this reason, for the case where it is discriminated in steps S7 and S8 that the laser spot has passed through the non-recorded area even only once throughout a single turn of the disk 40 and the process has advanced to step S11 and thereafter, the servo-processing microcomputer 22 controls the driver amplifier 25 through the servo-processing DSP 27 so as to rotate the feed motor 15 by a predetermined number of steps, to thereby move the optical pickup 11 by a predetermined distance towards the inner circumferential side of the disk, and then repeats processing of step S11 and thereafter until the H level is detected in all of the individual observation sampling cycles during a single turn of the disk 40. The following paragraphs will more specifically describe the procedure.

When the process advances to step S1, the servo-processing microcomputer 22 controls the driver amplifier 25 through the servo-processing DSP 27 so as to rotate the feed motor 15 by a predetermined number of steps, to thereby move the optical pickup 11 by a predetermined distance from the current position towards the inner circumferential side of the disk. In the present embodiment, the aforementioned predetermined distance by which the optical pickup 11 is moved is set to 50 μm (0.05 mm), for example. It is to be noted that for the optical disk reproducing device of the present embodiment, it is also allowable in step S11 to combine movement of the objective lens 13 in the tracking direction with the aid of the biaxial actuator in the optical pickup 11 and movement of the optical pickup 11 with the aid of the feed motor 15. For the case where the disk 40 is such as having the non-recorded area on the inner circumferential side, and such as allowing data to be recorded from the outer circumferential side, the optical disk reproducing device of the present embodiment in step S11 moves the optical pickup 11 towards the outer circumferential side of the disk. In another example where the initial position in step S0 is set in the read-in area or in an area on the inner circumferential side and having no data, the servo-processing microcomputer 22 in step S11 moves the optical pickup 11 towards the outer circumferential side of the disk.

Next, the servo-processing microcomputer 22 in step S12 observes whether the limit switch 31 is turned ON. If it is found in step S12 that the limit switch 31 has not been turned ON, the servo-processing microcomputer 22 advances its process to step S13.

On the other hand, if it is found in step S12 that the limit switch 31 has been turned ON, the servo-processing microcomputer 22 advances its process to step S20, recognizes the disk 40 as a blank medium having no data recorded therein at all up to the innermost circumferential area, or as an unsupported disk not covered by the DVD standards, and terminates the reproduction processing by the optical disk reproducing device.

In step S13, the servo-processing microcomputer 22 discriminates whether pulses have been detected for every turn of the spindle motor 10 (i.e., every turn of the disk 40), based on the rotation cycle signal from the FG detector 26. If the pulses have been detected for every turn of the disk 40 in step S13, the servo-processing microcomputer 22 advances its process to the next step S14 and thereafter.

In steps S14 and S15, the servo-processing microcomputer 22 discriminates whether the Rfdet signal from the comparator 18 has H level for every observation sampling cycle throughout a single turn of the optical disk 40, similarly to as in steps S7 and S8. It is to be noted that, if the discrimination is such that the Rfdet signal has not have H level even in a single observation sampling cycle out of those during a single turn of the disk 40 (i.e., L level has been detected even only once) in steps S14 and S15, the servo-processing microcomputer 22 advances its process to step S19. On the other hand, if H level has been detected for all of the observation sampling cycles (i.e., L level has not been detected at all), the process advances to step S16.

In step S16, the servo-processing microcomputer 22 adds "1" to a number which expresses that the laser spot has always fallen within the data-recorded area throughout a single turn of the disk 40 (referred to as "Rfdet count value", hereinafter), and advances its process to step S17.

On the other hand, when the process advanced to step S19, the servo-processing microcomputer 22 resets the Rfdet count value to "0", and returns the process to step S11. When the process returned to step S11, the servo-processing microcomputer 22 controls the driver amplifier 25 through the servo-processing DSP 27 so as to drive the feed motor 15 by a predetermined number of steps, to thereby move the optical pickup 11 by a predetermined distance from the current position towards the inner circumferential side, and then repeats processing of step S12 and thereafter.

In step S17, the servo-processing microcomputer 22 discriminates whether the Rfdet count value exceeds a prescribed value previously determined. The prescribed value can be exemplified by "1" and "3". FIG. 7 shows an exemplary case where the prescribed value is set to "3". In the optical disk reproducing device of the present embodiment, the prescribed number of the Rfdet count value is determined considering how far a point where reproduction of the disk 40 is started should desirably be distant from the boundary position between the non-recorded area and data-recorded area, and more specifically considering feed pitch of the optical pickup 11 per one step pulse of the feed motor 15, track pitch, speed of rotation of spindle motor 10, and so forth. In particular for the case where the prescribed number of the Rfdet count value is set to "3" as in the example described above, the optical disk reproducing device can successfully have a wider detection margin for the data-recorded area, and this ensures more accurate detection of the data-recorded area. On the other hand, for the case where the prescribed number of the Rfdet count value is set to "1", the optical disk reproducing device can successfully detect the data-recorded area in more rapid and accurate manners. The Rfdet count value is also available as a reproduction recovery point for the case where various retry operations occurred. That is, storing of a position corresponded to the Rfdet count value as the reproduction recovery point allows the retry operation to start conveniently at the reproduction recovery point, and thus ensures quick recovery. If it is discriminated in step S17 that the Rfdet count value does not exceed the prescribed value, the servo-processing microcomputer 22 returns its process to step S11.

When the process returns to step S11, the servo-processing microcomputer 22 controls the driver amplifier 25 through the servo-processing DSP 27 so as to rotate the feed motor 15 by a predetermined number of steps, to thereby move the optical pickup 11 by a predetermined distance from the current position towards the inner circumferential side, and then carries out the step S12 or thereafter.

On the other hand, if it is discriminated in step S17 that the Rfdet count value exceeds the prescribed value (which is "3" in the exemplary case in FIG. 7), the servo-processing microcomputer 22 advances its process to step S18. That is, the servo-processing microcomputer 22 advancing from step S17 to step S18 detects that H level has been detected in every observation sampling cycle throughout a single turn of the disk 40 each time the optical pickup 11 was step-wisely moved by a predetermined distance and by the prescribed value. In other words, the servo-processing microcomputer 22 detects that the laser spot always falls in the data-recorded area outside the boundary area even under a decentered condition of the disk 40 so as to allow the tracking servo to certainly be applied.

In step S18, the servo-processing microcomputer 22 controls the driver amplifier 25 through the servo-processing DSP 27 so as to turn the focus servo OFF, and returns its process back to step S4. When the process is returned back to step S4, the succeeding steps S7 and S8 show that the laser spot unconditionally resides in the data-recorded area throughout a single turn of the disk 40. The optical disk reproducing device thus can turn on the tracking servo in step S9 and thereafter, and this enables signal reproduction from the data-recorded area of the disk 40.

The following paragraphs will describe a series of operations from a step in which the optical disk reproducing device of the present embodiment isolates the boundary area from the data-recorded area on the decentered disk 40 to a step in which reproduction of the data-recorded area is started, showing a specific example and referring to FIG. 8. This example assumes a minimum unit of movement of the optical pickup 11 as 50 μm, and a prescribed number of the Rfdet count value in step S17 shown in FIG. 4 as "1". It is also assumed that the data-recorded area has a width of 0 μm to 350 μm in the radial direction of the disk, and the non-recorded area has a width both in a range from −150 μm to 0 μm, and from 350 μm to 450 μm, where the outermost boundary position among a number of boundary positions between the data-recorded area and non-recorded area is a reference point (0 μm). Assuming now that the amount of decentering of the disk 40 as 75 μm, the boundary area possibly brought into the data-recorded area by rotation of the disk 40 ranges from 0 μm to 150 μm, and from 200 μm to 350 μm. Failure (NG) in detection of the data-recorded area is determined when the Rfdet signal has L level even only once throughout a single turn of the disk, whereas success in detection of the data-recorded area is determined when the Rfdet signal always has H level throughout a single turn of the disk, where reproduction is to be started from the position of the data-recorded area upon detection thereof.

Referring now to FIG. 8, when the optical pickup 11 resides within a range from −150 μm to −100 μm, the Rfdet signal always has L level throughout a single turn of the disk, and the optical disk reproducing device of the present embodiment makes a decision of detection NG. If the optical pickup 11 is then moved by 50 μm towards the inner circumferential side, the optical pickup 11 resides within a range from −100 μm to −50 μm, where the Rfdet signal also in this time always has L level throughout a single turn of the disk, and the optical disk reproducing device of the present embodiment again makes a decision of detection NG. If the optical pickup 11 is further moved by 50 μm towards the inner circumferential side, the optical pickup 11 resides within a range from −50 μm to 0 μm, where the Rfdet signal also in this case always has L level throughout a single turn of the disk, and the optical disk reproducing device of the present embodiment again makes a decision of detection NG. Next, the optical pickup 11 is still further moved by 50 μm towards the inner circumferential side, so that the optical pickup 11 resides in the boundary area ranging from 0 μm to 50 μm, where the Rfdet signal in this case has both of H level and L level throughout a single turn of the disk, and this allows the optical disk reproducing device of the present embodiment to make a decision of detection NG. Similarly, further movement by 50 μm of the optical pickup 11 towards the inner circumferential side allows the optical pickup 11 to fall still within the boundary area ranging from 50 μm to 100 μm, where the Rfdet signal in this case has both of H level and L level throughout a single turn of the disk, and this allows the optical disk reproducing device of the present embodiment to make a decision of detection NG. Still further movement by 50 μm of the optical pickup 11 towards the inner circumferential side allows the optical pickup 11 to fall still within the boundary area ranging from 100 μm to 150 μm, where the Rfdet signal in this case has both of H level and L level throughout a single turn of the disk, and this allows the optical disk reproducing device of the present embodiment to make a decision of detection NG. Next, the optical pickup 11 is still further moved by 50 μm towards the inner circumferential side, so that the optical pickup 11 resides in the area ranging from 150 μm to 200 μm, which corresponds to the data-recorded area outside the boundary area, where the Rfdet signal in this case always has H level throughout a single turn of the disk, and this allows the optical disk reproducing device of the present embodiment to make a decision of detection successful, where reproduction of data is started. That is, as is clear from FIG. 8, even for the case where the disk has an amount of decentering of as large as 75 μm, and the data-recorded area has a width of only as narrow as 350 μm, the optical disk reproducing device of the present embodiment is successful in detecting the data-recorded area outside the boundary area which consequently has only an extremely small width of 150 μm to 200 μm, and can reproduce data stored therein.

As has been described in the above, the optical disk reproducing device of the present embodiment can isolate the boundary area from the data-recorded area with a high accuracy irrespective of presence or absence of decentering of the disk 40 or amount of decentering, can certainly apply tracking servo to the data-recorded area after being isolated from the boundary area, and as a consequence can rapidly and precisely detect the boundary position. The starting position of reproduction on the data-recorded area after being isolated from the boundary area is 0.05 mm distant from the boundary area for the case where the prescribed number of the Rfdet count value is "1", whereas 0.15 mm distant from the boundary area for the case where the prescribed number is "3". The optical disk reproducing device of the present embodiment, capable of precisely isolating the boundary area from the data-recorded area, is also advantageous in that the starting position of reproduction can be set precisely, and in that tracking servo can certainly be applied to the data-recorded area even if the width of the data-recorded area is only as small as being slightly wider than that of the boundary area (a width corresponded to the amount of decentering), so as to allow data stored in the data-recorded area to be reproduced. The optical disk reproducing device of the present embodiment is still also advantageous in that it does not cause malfunction of tracking servo in the boundary area unlike the conventional optical disk reproducing device, and in that it is free from wasteful operations such as moving the optical pickup once towards the inner circumferential side of the disk and then returning it back to the outer circumferential side.

Second Embodiment

The next paragraphs will describe an exemplary case according to the second embodiment of the present invention, in which a bottom hold signal (BH signal) and a top hold signal (TH signal) of the RFDC signal are generated, and a differential of the BH signal and TH signal is compared with the reference level.

Figure 9:
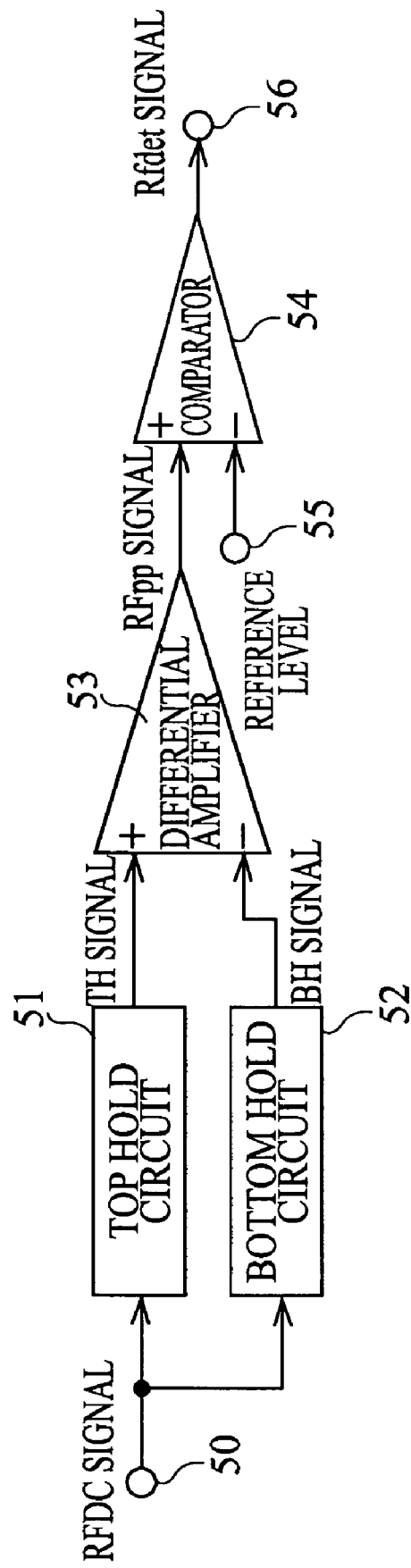
FIG. 9 is a block diagram showing an exemplary constitution of an optical disk reproducing device according to a second embodiment.

The optical disk reproducing device of the second embodiment has a configuration shown in FIG. 9 in place of the bottom hold circuit 17 and the comparator 18 in FIG. 3. It is to be noted now that the optical disk reproducing device of the second embodiment has a constitution similar to that shown in FIG. 3 except for the configuration shown in FIG. 9, so that the description of the same or similar parts and elements will be omitted.

Figure 10:
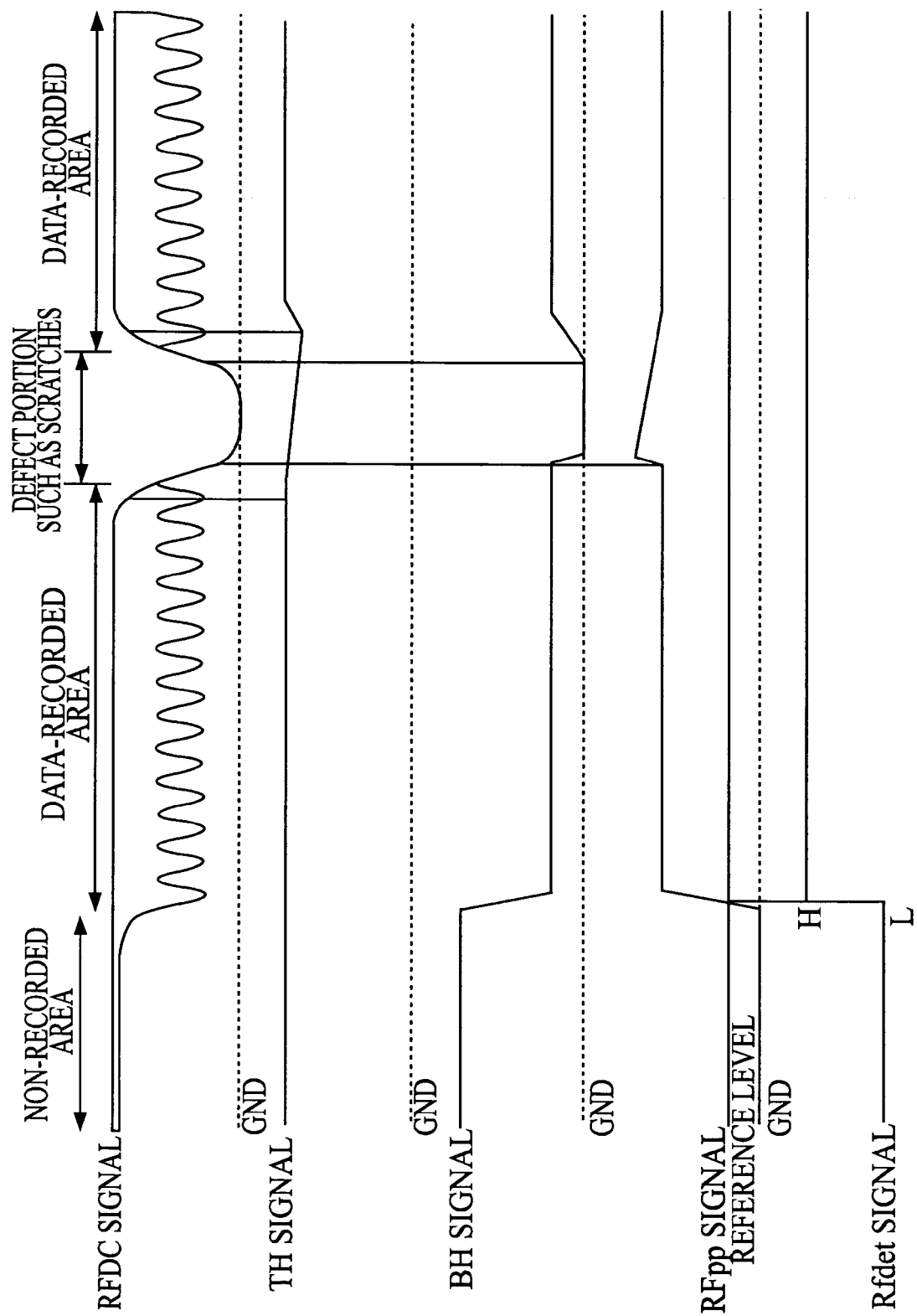
FIG. 10 is a timing chart for describing interrelations among RFDC signal, TH signal, BH signal, reference level and Rfdet signal in the second embodiment.

To a terminal 50 in this configuration shown in FIG. 9, the RFDC signal shown in FIG. 10, which is the same as that shown in FIG. 6, is fed. The RFDC signal is then sent to a top hold circuit 51 and a bottom hold circuit 52.

The bottom hold circuit 52 generates the bottom hold signal (BH signal) of a modulated component contained in the RFDC signal as shown in FIG. 10, and sends the BH signal to an inverting input terminal of a differential amplifier 53. The top hold circuit 51 generates the top hold signal (TH signal) of a modulated component contained in the RFDC signal as shown in FIG. 10, and sends the TH signal to a non-inverting input terminal of a differential amplifier 53. Hold time constants of these hold circuits are set to values which will not be affected by variation in amplitude of the laser spot which possibly occurs when the laser spot traverses defect portion such as scratches on the disk 40, or a plurality of tracks.

The differential amplifier 53 calculates a differential of the TH signal and the BH signal to thereby generate an amplitude signal (referred to as "RFpp signal", hereinafter) of the modulated component as shown in FIG. 10. The RFpp signal output from the differential amplifier 53 is then sent to a non-inverting input terminal of a comparator 54.

To an inverting input terminal of the comparator 54, the reference level value (threshold value) generated by the servo-processing microcomputer 22 has been input through a terminal 55, similarly to as described in the above. The comparator 54 then compares a level value of the RFpp signal and the reference level value, and outputs a signal having L level when the level value of the RFpp signal is lower than the reference level value, and outputs a signal having H level (Rfdet signal) when the level value of the RFpp signal is higher than the reference level value, as shown in FIG. 10. Because the second embodiment is designed so that the RFpp signal, which is a differential between the BH signal and TH signal, is compared with the reference level, the detection of H and L levels of the Rfdet signal is not affected by defect portion on the disk such as scratches or the like, even if the RFDC signal drops to as low as the ground level due to the scratches or the like. It is to be noted that the reference level in the second embodiment may differ from that in the first embodiment.

Figure 11:
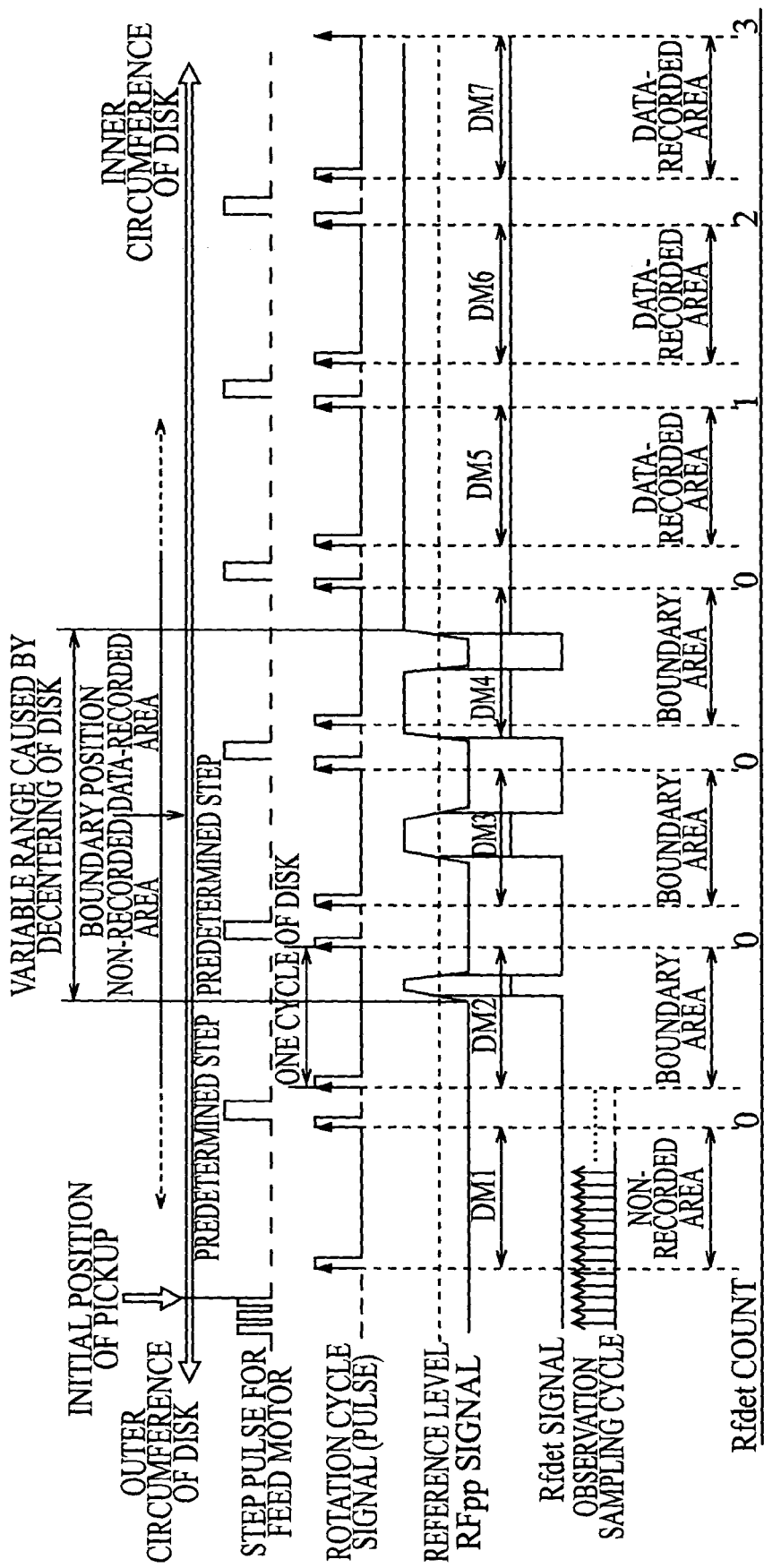
FIG. 11 is a timing chart for describing specific operations such that the optical disk reproducing device of the second embodiment successively moves the optical pickup, and starts reproduction of the data in the data-recorded area.

Similarly to as shown in FIG. 6, H level of the Rfdet signal expresses that the laser spot falls in the data-recorded area on the disk 40, and L level in the non-recorded area. The Rfdet signal is then sent to the servo-processing microcomputer 22. Process thereafter is similar to as described in the above. It is to be noted that FIG. 11 shows signal waveforms in the individual sections in the optical disk reproducing device of the second embodiment, in a similar form as previously shown in FIG. 7. Difference between FIG. 11 and FIG. 7 resides in that the FIG. 7 shows the BH signal as a target of comparison with the reference level, whereas FIG. 11 shows the RFpp signal.

The optical disk reproducing device of the second embodiment basically has effects similar to those in the first embodiment, and is capable of isolating the boundary area from the data-recorded area with a high accuracy irrespective of presence or absence of decentering of the disk 40 or amount of decentering, capable of certainly applying tracking servo and, as a consequence, capable of rapidly and precisely detect the boundary position. Moreover, the optical disk reproducing device can certainly apply the tracking servo even when the data-recorded area has a width only slightly larger than that of the boundary area and, as a consequence, data recorded in the data-recorded area can successfully be reproduced.

According to the aforementioned first and second embodiments, it is not always necessary to accurately coincide detection time required for certainly finding the data-recorded area as being isolated from the boundary area with one cycle of the disk 40, and the detection time may be a duration of time corresponded to a single turn of the disk 40. In particular the detection time set to the time corresponded to a single turn of the disk 40 can relieve process load of the servo-processing microcomputer 22 as compared with the case using the rotation cycle signal from the FG detector 26.

The above description expresses only exemplary cases of the present invention. The present invention is by no means limited to the cases described in the above, and any modification based on various designs are of course allowable without departing from the technical spirit of the present invention. For example, the present invention is also applicable to an optical disk reproducing device originally having a constitution for applying tracking servo to a pre-groove, and is particularly valuable when the boundary position between the data-recorded area and non-recorded area is to be detected before reproduction is started.

According to the present invention, in which of the first area and second area the spot light falls is discriminated throughout a single turn of the optical disk, so that the data-recorded area as the first area can certainly be detected. It is also made possible to rapidly and precisely reproduce data recorded in the optical disk irrespective of degree of decentering of the disk or volume of data recorded in the disk, if tracking servo is applied when the spot light falls in the first area (e.g., data-recorded area) throughout a single turn of the optical disk.

According to the present invention, if the spot light passes through the second area even only once throughout a single turn of the optical disk, the spot light is moved by a predetermined distance in the radial direction of the optical disk, and the observation is repeated. This makes it possible to precisely detect the boundary position between the first area (e.g., data-recorded area) and the second area (e.g., non-recorded area), where if the optical disk is descentered, the boundary area corresponded to the amount of decentering can successfully be isolated from the first area (data-recorded area).

What is claimed is:

1. An optical disk reproducing device comprising:
   a motor for rotating an optical disk having at least one of a first area and a second area;
   an optical head for receiving a spot light after being reflected on the optical disk;
   a signal generating section for generating a comparison reference signal from an output signal of the optical head;
   a comparing section for comparing the comparison reference signal with a predetermined threshold value, and generating a comparison signal containing at least one of a first signal status corresponding to the first area and a second signal status corresponding to the second area; and
   a control section for observing signal status of the comparison signal at least throughout a duration during which the spot light goes round once on the optical disk, and making a decision based on the observed result, about in which of the first area and the second area the spot light falls, wherein
   the signal generating section generates a bottom hold signal of the output signal from the optical head as the comparison reference signal; and
   the comparing section generates the comparison signal which takes the first signal status when the comparison reference signal came short of the predetermined threshold value, and takes the second signal status when the comparison reference signal exceeded the predetermined threshold value.

2. The optical disk reproducing device according to claim 1, wherein
   the comparing section generates the comparison signal containing both of the first signal status and the second signal status at the case that the spot light travels through the first and second areas throughout a duration during which the spot light goes round once on the optical disk.

3. The optical disk reproducing device according to claim 1, further comprising:
   a spot light moving section for moving the spot light in a radial direction of the optical disk,
   wherein the control section controls the spot light moving section so as to move the spot light by a predetermined distance in the radial direction of the optical disk, whenever the second signal status was detected even only once at least throughout a duration during which the spot light went round once on the optical disk.

4. The optical disk reproducing device according to claim 3, wherein the control section repeats a predetermined number of times of a series of operations for moving the spot light by the predetermined distance by controlling the spot light moving section after initial detection of sustainment of the first signal status at least throughout a duration daring which the spot light went round once on the optical disk, and controls the optical head so as to start the tracking servo only after detection of sustainment of the first signal status in all of the repetitive series of operations.

5. The optical disk reproducing device according to claim 1, wherein the control section makes a decision on whether the first signal status was sustained at least throughout a duration during which the spot light went round once on the optical disk, based on the observed result.

6. The optical disk reproducing device according to claim 5, wherein the control section stores a relative position of the spot light and the optical disk when the sustainment of the first signal status was detected, and sets the relative position as an initial position where the next irradiation of the spot light is started.

7. The optical disk reproducing device according to claim 1, wherein the control section controls the optical head so as to activate a tracking servo when the control detects that the first signal status was sustained at least throughout a duration during which the spot light went round once on the optical disk.

8. An optical disk reproducing device comprising:
- a motor for rotating an optical disk having at least one of a first area and a second area;
- an optical head for receiving a spot light after being reflected on the optical disk;
- a signal generating section for generating a comparison reference signal from an output signal of the optical head;
- a comparing section for comparing the comparison reference signal with a predetermined threshold value, and generating a comparison signal containing at least one of a first signal status corresponding to the first area and a second signal status corresponding to the second area;
- a control section for observing signal status of the comparison signal at least throughout a duration during which the spot light goes round once on the optical disk, and making a decision, based on the observed result, about in which of the first area and the second area the spot light falls; and
- a threshold value generating section for detecting a peak level of the output signal from the optical head when the spot light was irradiated onto a mirror surface on the optical disk, and generating the predetermined threshold value based on a level within the peak level.

9. The optical disk reproducing device according to claim 8, wherein
- the signal generating section generates a differential signal of a top-hold signal and a bottom-hold signal of the output signal from the optical head as the comparison reference signal; and
- the comparing section generates the comparison signal which takes the first signal status when the comparison reference signal exceeded the predetermined threshold value, and takes the second signal status when the comparison reference signal came short of the predetermined threshold value.

10. The optical disk reproducing device according to claim 8, wherein the control section makes a decision on whether the first signal status was sustained at least throughout a duration during which the spot light went round once on the optical disk, based on the observed result.

11. The optical reproducing device according to claim 10, wherein the control section stores a relative position of the spot light and the optical disk when the sustainment of the first signal status was detected, and sets the relative position as an initial position where the next irradiation of the spot light is started.

12. The optical disk reproducing device according to claim 8, further comprising:
- a spot light moving section for moving the spot light in a radial direction of the optical disk,
- wherein the control section controls the spot light moving section so as to move the spot light by a predetermined distance in the radial direction of the optical disk, whenever the second signal status was detected even only once at least throughout a duration during which the spot light went round once on the optical disk.

13. The optical disk reproducing device according to claim 12, wherein the control section repeats a predetermined number of times a series of operations for moving the spot light by the predetermined distance by controlling the spot light moving section after initial detection of sustainment of the first signal status at least throughout a duration during which the spot light went round once on the optical disk, and controls the optical head so as to start the tracking servo only after detection of sustainment of the first signal status in all of the repetitive series of operations.

14. The optical disk reproducing device according to claim 8, wherein the control section controls the optical head so as to activate a tracking servo when the control section detects that the first signal status was sustained at least throughout a duration during which the spot light went round once on the optical disk.

15. A method of reproducing an optical disk comprising the steps of:
- rotating an optical disk having at least one of a first area and a second area;
- generating a light reception signal of a spot light reflected by the optical disk after being irradiated therewith;
- generating a comparison reference signal from the light reception signal;
- generating a comparison signal containing at least either one of a first signal status corresponded to the first area and a second signal status corresponded to the second area, by comparing the comparison reference signal with a predetermined threshold value;
- observing signal status of the comparison signal at least throughout a duration during which the spot light goes round once on the optical disk, and making a decision, based on the observed result, about in which of the first area and the second area the spot light falls;
- generating a bottom hold signal of the light reception signal as the comparison reference signal; and
- generating the comparison signal which takes die first signal status when the comparison reference signal came short of the predetermined threshold value, and takes the second signal status when the comparison reference signal exceeded the predetermined threshold value.

16. A method of reproducing an optical disk comprising the steps of:
- rotating an optical disk having at least one of a first area and a second area;
- generating a light reception signal of a spot light reflected by the optical disk after being irradiated therewith;
- generating a comparison reference signal from the light reception signal;
- generating a comparison signal containing at least one of a first signal status corresponding to the first area and a second signal status corresponding to the second area, by comparing the comparison reference signal with a predetermined threshold value;

observing signal status of the comparison signal at least throughout a duration during which the spot light goes round once on the optical disk, and making a decision, based on the observed result, about in which of the first area and the second area the spot light falls;

detecting a peak level of the light reception signal when the spot light was irradiated onto a mirror surface on the optical disk; and generating the predetermined threshold value based on a level within the peak level.

* * * * *